United States Patent [19]
Mater et al.

[11] 3,826,951
[45] July 30, 1974

[54] CIRCUIT BREAKER WITH REPLACEABLE RATING ADJUSTER AND INTERLOCK MEANS

[75] Inventors: Alfred E. Mater, Beaver Falls; Alan B. Shimp, Monroeville, both of Pa.

[73] Assignee: Westinghouse Electric Corporation, Pittsburgh, Pa.

[22] Filed: Jan. 30, 1973

[21] Appl. No.: 327,972

[52] U.S. Cl. ............... 317/33 SC, 335/160, 335/172
[51] Int. Cl. ........................ H02h 3/08, H01h 73/00
[58] Field of Search .......... 317/18 D, 33 R; 335/42, 335/138, 45, 144, 34, 77, 160, 172

[56] References Cited
UNITED STATES PATENTS

| | | | |
|---|---|---|---|
| 2,354,162 | 7/1944 | Weber | 335/42 X |
| 3,559,120 | 1/1971 | Myers | 335/42 |
| 3,662,134 | 5/1972 | Cellerini | 200/146 R |
| 3,733,517 | 5/1973 | Wilson | 317/18 D |

Primary Examiner—J. D. Miller
Assistant Examiner—Patrick R. Salce
Attorney, Agent, or Firm—W. A. Elchik

[57] ABSTRACT

An improved circuit breaker comprises an externally accessible plug-in type replaceable rating adjuster removably supported on the housing of the circuit breaker. The rating adjuster comprises resistor means having a first resistance value. The plug-in rating adjuster can be removed and replaced by another plug-in rating adjuster comprising resistor means having a different resistance value to thereby enable a rating change of the circuit breaker in the field. Interlock means is provided to automatically trip the circuit breaker if the circuit breaker is closed when the rating adjuster is removed and to maintain the circuit breaker in a tripped condition so long as the rating adjuster is removed to thereby prevent operation of the circuit interrupter while the rating adjuster is removed. Keying means prevents the mounting of an improper rating adjuster on the breaker.

8 Claims, 10 Drawing Figures

CIRCUIT BREAKER WITH REPLACEABLE RATING ADJUSTER AND INTERLOCK MEANS

CROSS-REFERENCES TO RELATED APPLICATIONS

Cross-reference is herein made to the copending applications of Alfred E. Maier et al. Ser. No. 327,964; Alfred E. Maier Ser. No. 327,961 and Alan B. Shimp Ser. No. 327,973 all of which applications are filed concurrently herewith.

BACKGROUND OF THE INVENTION

1. Field of the Invention

Circuit breakers of the type comprising a latched stored-energy mechanism releasable to effect tripping of the circuit breaker and trip means automatically operable in response to overload current conditions to effect release of the releasable mechanism.

2. Description of the Prior Art

A molded-case type circuit breaker having an operating mechanism of the type herein disclosed is disclosed in the patent to Cellerini, U.S. Pat. No. 3,662,134.

SUMMARY OF THE INVENTION

An improved multi-pole circuit breaker comprises an insulation housing and a circuit breaker structure supported in the housing. The circuit breaker structure comprises a pair of contacts for each pole unit and a releasable mechanism releasable to effect opening of all of the contacts. Sensing means is provided for sensing overload currents in the breaker, and solid state circuitry, responsive to the sensing means, operates through an electromechanical transducing means to effect release of the mechanism upon the occurrence of an overload current condition. An externally accessible replaceable plug-in type rating adjuster is removably supported on the housing. The rating adjuster comprises resistor means having a first resistance value. The rating adjuster can be removed and replaced with another rating adjuster having a resistance means with a different resistance value to thereby permit a rating change of the breaker in the field. Interlock means is automatically operable to trip the circuit breaker and to maintain the circuit breaker in the tripped condition when the plug-in type rating adjuster is removed from the circuit breaker.

Figure 1:
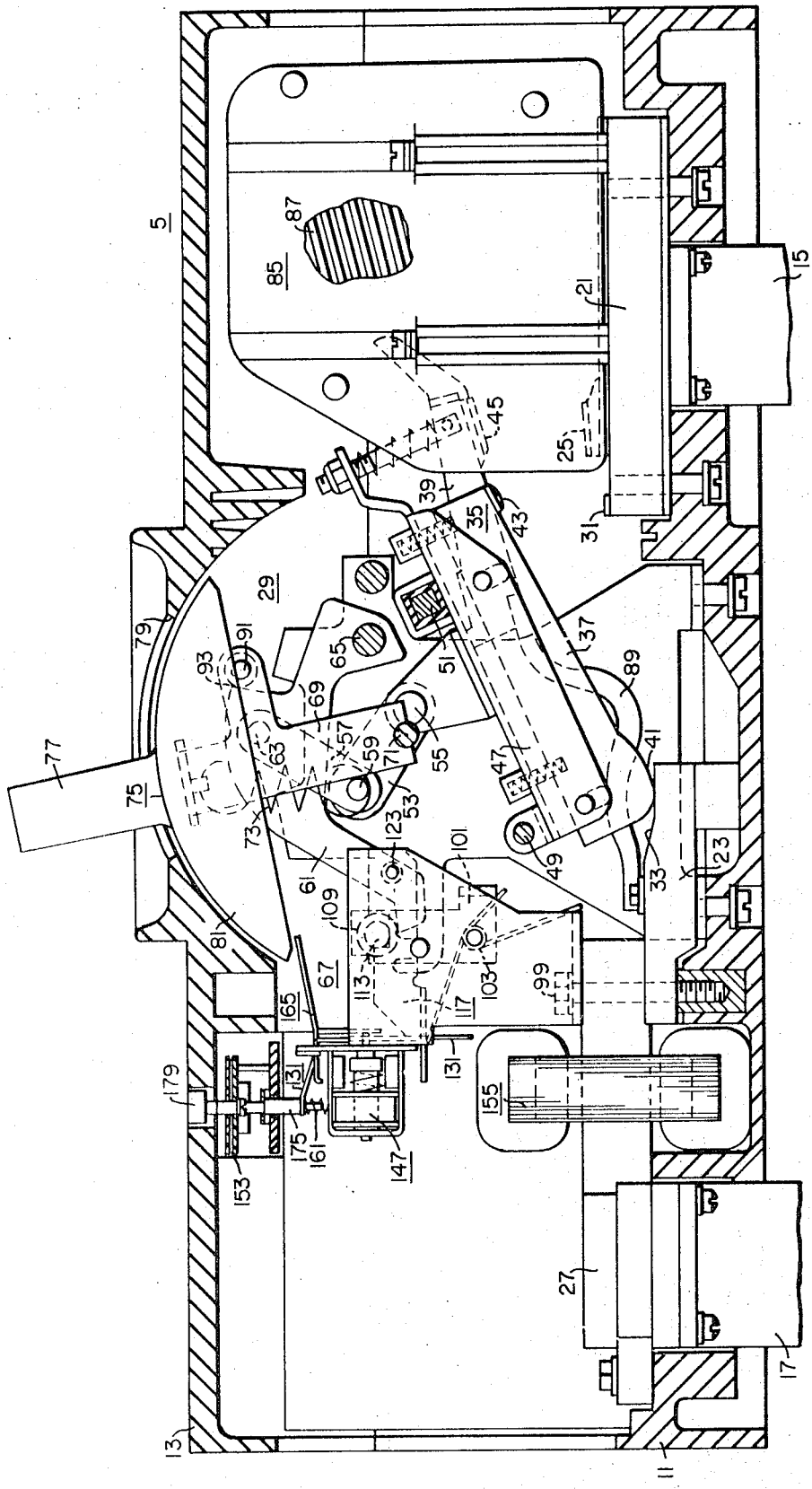
FIG. 1 is a side sectional view, with parts broken away, through the center pole unit of a three-pole circuit breaker and taken along the lines I—I of FIG. 2.
Figure 2:
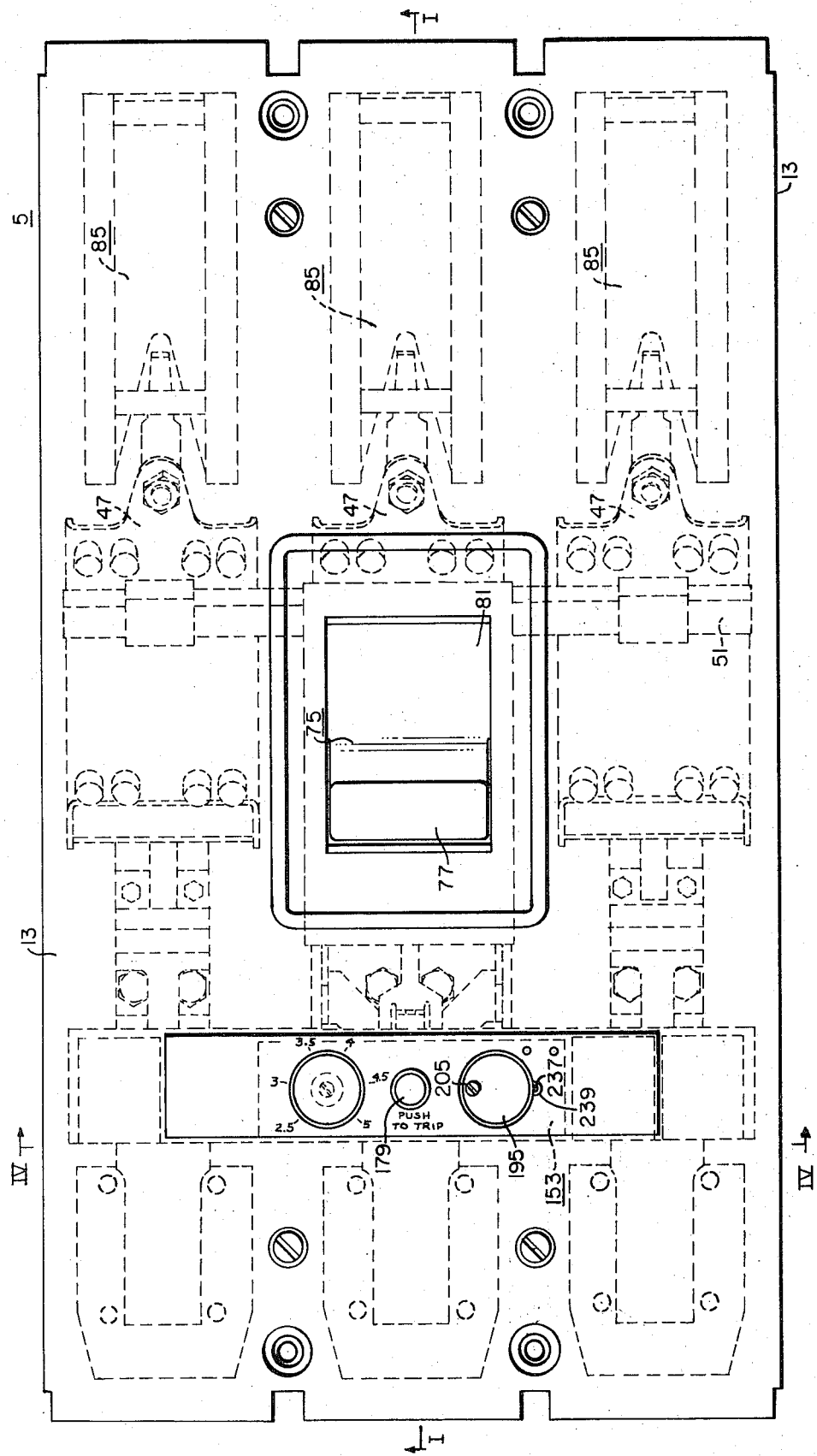
FIG. 2 is a top plan view of the circuit breaker seen in FIG. 1.

Referring to the drawings, there is shown, in FIGS. 1 and 2, a three-pole molded-case or insulating-housing type circuit breaker 5. The circuit breaker 5 comprises an insulating housing comprising a molded insulating base 11 and a molded insulated cover 13. Suitable insulating barrier means separates the housing 11, 13 into three adjacent insulating compartments for housing the three pole units of the three-pole circuit breaker in a manner well-known in the art. In each pole unit, two terminals 15 and 17 are provided at openings in the base 11 in proximity to the opposite ends of the housing to enable connection of the circuit breaker in an electric circuit.

In each of the three pole-unit compartments of the circuit breaker, there are two conductors 21 and 23 suitably secured to the base 11. The terminal 15 is secured to the flat under surface of the conductor 21. A stationary contact 25 is fixedly secured to the front of the conductor 21. A rigid main conductor 27 is mounted on the base 11 and connected, at one end thereof, to the conductor 23. The other terminal 17 is connected to the flat under surface of the conductor 27.

A single stored-energy type operating mechanism 29, for controlling all three pole units, is mounted in the center pole unit compartment of the circuit breaker. In addition to the stationary contact 25, there is a stationary contact 31 mounted on the conductor 21 and a stationary contact surface 33 on the conductor 23 in each pole unit of the circuit breaker. The operating mechanism 29 is operable to move a movable contact structure indicated generally at 35 between open and closed positons. The movable contact structure 35 is of the type more specifically described in the patent to Cellerini U.S. Pat. No. 3,662,134. The movable contact structure 35 comprises a plurality of main bridging contact arms 37 and an arcing contact arm 39. Each of the main bridging contact arms 37 comprises a contact surface 41 cooperable with the stationary contact surface 33 and a contact 43 cooperable with the contact 31. The arcing contact arm 39 comprises a contact 45 cooperable with the stationary contact 25. The contact structure 35 is supported on a contact carrier 47 that is supported for pivotal movement about a pivot pin 49. A rigid insulating tie bar 51 extends across all three pole units and is connected to the three contact carriers 47 to simultaneously move the three contact carriers 47 between open and closed positions. The contact carrier 47, for the center pole unit, is pivotally connected to a lower toggle link 53 by means of a pivot pin 55. The lower toggle link 53 is pivotally connected to an upper toggle link 57 by means of a knee pivot pin 59. The upper toggle link 57 is pivotally connected to a releasable trip member 61 by means of a pivot pin 63. The releasable trip member 61 is supported at one end thereof for pivotal movement about a fixed pivot pin 65. The releasable trip member 61 is latched, at the other end thereof, by means of a latch structure 67. An inverted generally U-shaped operating lever 69 is supported at the inner ends of the legs thereof for pivotal movement on a pair of fixed pins 71. Tension springs 73 are connected at the lower ends thereof to the knee pivot 59 and at the upper ends thereof to the bight portion of the operating lever 69. A handle structure 75 is connected to the front end of the operating lever 69 and comprises a handle part 77 that extends out through an opening 79 in the front of the cover 13. The handle structure 75 comprises a shroud 81 that substantially closes the opening 79 in all positions of the handle structure 75. In each pole unit, an arc-extinguishing structure 85, comprising a plurality of generally U-shaped magnetic plates 87 supported in a spaced stacked relationship. The arc-extinguishing structure 85 operates to extinguish arcs drawn between the contacts 25, 45 during opening operations in a manner well-known in the art.

In each pole unit, the arcing contact arm 39 is electrically connected to the conductor 23 by means of a flexible conductor 89. In the closed position of the contacts, the circuit, through each pole unit, extends from the terminal 17 through the conductor 27, the conductor 23, the movable contact structure 35, the conductor 21, to the other terminal 15. The main bridging contact arms 37 carry most of the current in the closed position of the contacts, and the current path through these contact arms extends from the contact surfaces 33, through the contacts 41, the bridging contact members 37, the contacts 43, to the contact 31. During opening operations, the main bridging the contacts 43, 31 separate first and thereafter, the current is carried from the conductor 23 through the flexible conductor 89, the arcing contact arm 39, the arcing contact 45 and the arcing contact 25. When the arcing contact arm 39 separates an arc is drawn between the contacts 25, 45 and extinguished in the art-extinguishing structure 85 in a manner well-known in the art.

The circuit breaker is shown in FIG. 1 in the open position with the releasable trip number 61 latched in the latched position shown by means of the latch mechanism 67. In order to close the circuit breaker, the handle 77 is moved in a clockwise direction from the off or open position to the on or closed position to move the operating lever 69 clockwise about the pivot 71. During this movement, the overcenter springs 73 are moved over center to erect the toggle 53, 57 to thereby pivot the movable contact structure 35 of the center pole unit in a clockwise direction about the pivot 49 to the closed position. With the three contact carriers 47 being connected for simultaneous movement by means of the tie bar 51, this movement serves to simultaneously move all three of the movable contact structures to the closed position. When it is desired to manually open the circuit breaker, the handle 77 is moved counterclockwise to the off position seen in FIG. 1. This moves the springs 73 over center to cause collapse of the toggle 53, 57 to thereby move the contact structures 35 to the open position illustrated in FIG. 1. Each of the contact carriers 47 and movable contact structures 35 moves about the associated pivot pin 49 with all of the contact carriers and movable contact structures moving about a common axis between the open and closed positions.

When the circuit breaker is in the closed position and an overload occurs in any of the three pole-units, the releasable member 61 will be released, in a manner to be hereinafter described, to automatically trip the circuit breaker open. Upon release of the releasable member 61, the springs 73, which are in a charged condition, rotate the trip member 61 in a clockwise direction about the pivot 65 to cause collapse of the toggle 53, 57 to thereby move the three contact carriers 47 and movable contact structures 35 to the open position in a manner well-known in the art. Upon tripping movement of the circuit breaker, the handle 77 is moved to an intermediate position in between the "off" and "on" positions to provide a visual indication that the circuit breaker has tripped open.

Following a tripping operation, it is necessary to reset and relatch the circuit breaker mechanism before the contacts can be closed. Resetting and relatching is achieved by moving the handle 77 to a position past the "off" position. During this movement, a pin member 91 on the member 69 engages a shoulder portion 93 on the releasable member 61, and the releasable member 61 is moved down to a position to relatch the latch structure 67 in a manner to be hereinafter described. Following relatching of the latch structure 67, when the operator releases the handle 77 the releasable member 61 will again be reset and relatched in the position seen in FIG. 1. Thereafter, the circuit breaker can be operated in the same manner as was hereinbefore described.

Figure 3:
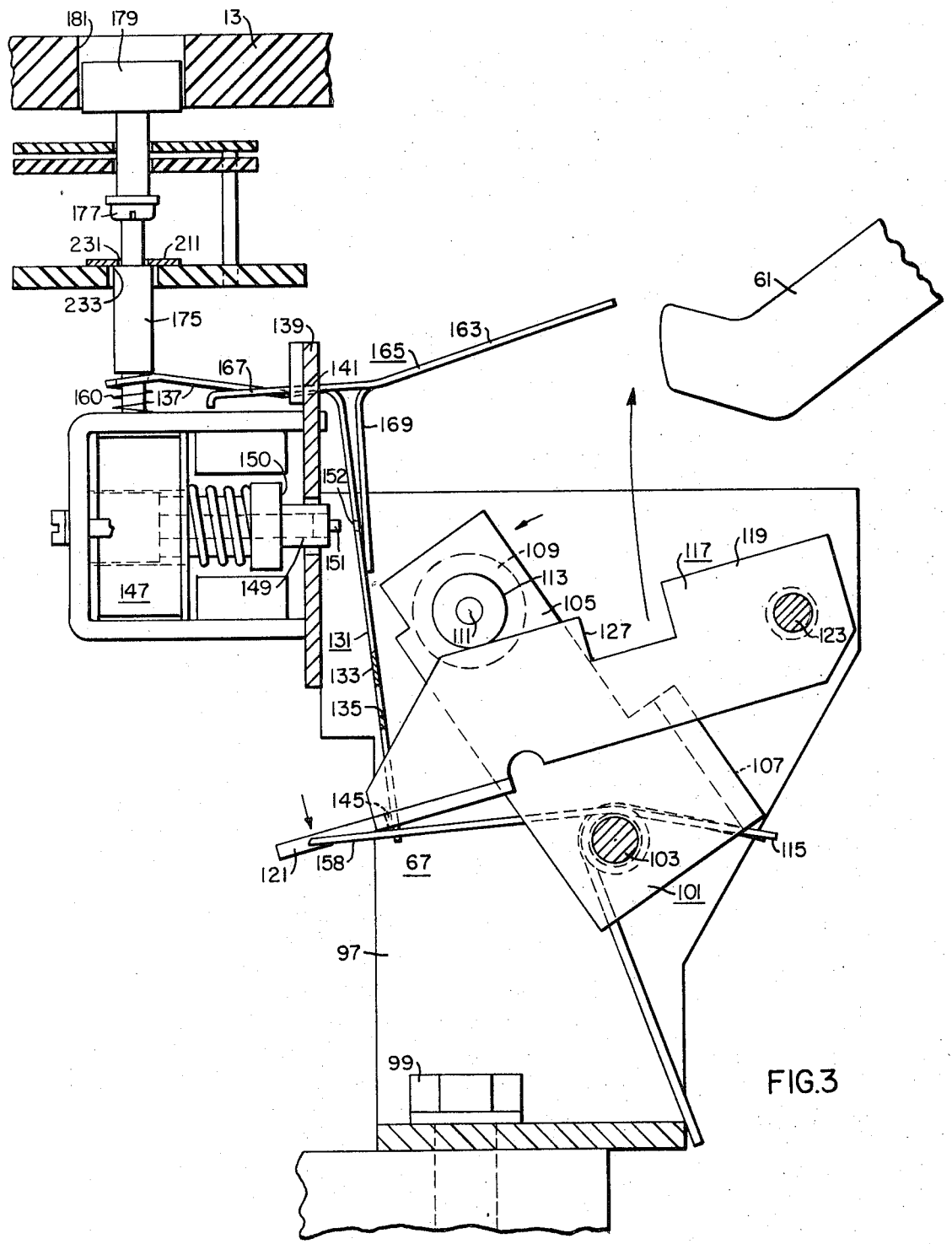
FIG. 3 is a sectional view, with parts broken away, illustrating the position of certain parts when the rating adjuster is removed.

Referring to FIG. 3, the latch structure 67 comprises a generally U-shaped support bracket 97 that is secured to the conductor 27 of the center pole unit and to the base 11 by means of a path of bolts 99. A first latch member indicated at generally at 101 is mounted for pivotal movement on a pivot pin 103 that is secured between the opposite side plates of the support bracket 97. The first latch member 101 comprises a pair of spaced leg parts 105 and a bight part 107 connecting the spaced leg parts 105. A first roller 109 is supported between the leg parts 105 on a pin 111 that is secured to the spaced leg parts 105. A pair of second rollers 113 are also supported on the pin 111 on the outer sides of the spaced leg parts 105. A torsion spring 115 biases the first latch member 101 in a counterclockwise direction about the pivot pin 103. The latch structure 67 also comprises a second latch member indicated generally at 117. The second latch member 117 comprises a pair of spaced leg parts 119 and an intermediate or bight part 121 that connects the opposite spaced leg parts 119. A pair of spaced pins 123 (FIGS. 2–4) are secured to the side plates of the supporting frame 97, and the spaced legs 119 are pivotally supported on the pins 123 to support the second latch member 117 for pivotal movement on the pins 123. The opposite legs 119 of the latch member 117 are provided with notches 127 therein for receiving the rollers 113 in a manner to be hereinafter described. The latch structure 67 also comprises a third latch member, indicated generally at 131, that latches the second latch member 117 in the latched position seen in FIG. 1. The third latch member 131 comprises a downwardly extending leg 133, having a window opening 135 (FIG. 3) therein, and a generally horizontal leg 137. The latch member 131 is supported on a support plate 139 for pivotal movement about an axis normal to the plane of the paper as seen in FIG. 3 and indicated generally at 141. The connecting part 121 of the second latch member 117 has a small projecting part 145 that rests on a ledge in the window opening 135 to latch the second latch member in the latched position seen in FIG. 1. The latch structure 67 is more specifically described in the above-mentioned U.S. Pat. application of Alfred E. Maier, Ser. No. 327,961.

The latch structure 67 is automatically unlatched upon the occurrence of overload current conditions by means of a magnetic trip actuator indicated generally at 147. The magnetic trip actuator 147 is more specifically described in the above-mentioned copending U.S. Pat. application of Alfred E. Maier, Ser. No. 327,961.

The magnetic trip actuator 147 comprises an armature plunger 148 that is maintained in the inoperative position by magnetic means and spring biased towards an extended or actuating position by means of a spring 149. The plunger 148 comprises a shoulder part 150 and an extension 151 that extends through an opening 152 in the latch member 131 during tripping operations. A static circuit board indicated generally at 153 (FIG. 1) supported near the front of the breaker. The static circuit board 153 supports the components of a static trip circuit (FIG. 8) that is more specifically described in the above-mentioned copending patent application of Alan B. Shimp, Ser. No. 327,973. In each pole unit, a first current transformer indicated generally at 155 (FIG. 1) is supported around the associated conductor 27. Upon the occurrence of an overload in any of the pole units, the associated transformer 155 senses the overload and operates through the static circuit 153 to pulse the magnetic trip actuator 147 to thereby release the front armature plunger 149 whereupon the spring 149 moves the armature plunger 148 from the initial position seen in FIG. 1 to an extended actuating position. This operation is more specifically described in the above-mentioned U.S. Pat. applications of Alfred E. Maier, Ser. No. 327,961, Alfred E. Maier et al., Ser. No. 327,964, and Alan B. Shimp, Ser. No. 327,973.

Upon movement of the armature plunger 148 to the extended actuating or tripping position, the shoulder part 150 engages and pivots the third latch member 131 in a counterclockwise direction about the pivot 141 to effect a tripping operation of the circuit breaker in a manner to be hereinafter described.

The circuit breaker is shown in FIG. 1 with the releasable member 61 in the latched position. In this position of the releasable member 61, when the circuit breaker contacts are in the closed position, the toggle 53, 57 is erected and the springs 73 are in a charged condition biasing the toggle 53, 57 toward a collapsed position. In this position, the charged springs 73 bias the upper toggle link 57 to bias the releasable member 61 in a clockwise direction about the pivot 65. This movement is prevented by the engagement of the free end of the releasable member 61 engaging the latch roller 109 and biasing the first latch member 101 in a counterclockwise direction about the pivot 103. This movement is limited by the engagement of the latch rollers 113 with the spaced arm portions of the second latch member 117, with the rollers 113 being disposed in the slots 127 of the spaced leg portions of the second latch member 117. The force of the operating springs 73, operating through the first latch member 101 and the second latch member 117, biases the second latch member in a counterclockwise direction about the pivot 123. Counterclockwise movement of the second latch member 117 is prevented by the engagement of the latch projection 145 (FIG. 3) with the ledge in the window opening 135 of the third latch member 131 so that with the parts in the position seen in FIG. 1, the stored energy operating mechanism is latched and will remain latched until the releasable member 61 is released.

Upon movement of the plunger 148 to the extended actuating or tripping position, the circuit breaker is tripped. During this movement, the shoulder 150 of the plunger 148, operating against the third latch member 131, pivots the third latch member 131 in a counterclockwise direction about the pivot 141 whereupon the window latch 135 of the third latch member 131 releases the projection 145 to thereby release the second latch member 117. Upon release of the second latch member 117, the springs 73 (FIG. 1) move the releasable member 61 in a clockwise direction about the pivot 65. This movement of the releasable member 61 operates through the first roller member 109 and second roller members 113 to move the first latch member 101 counterclockwise and to move the second latch member 117 counterclockwise to the unlatched tripped open position seen in FIG. 4. During this movement, the releasable member 61 moves to the tripped position to effect collapse of the toggle 53, 57 to trip the circuit breaker in the manner hereinbefore described.

Figure 4:
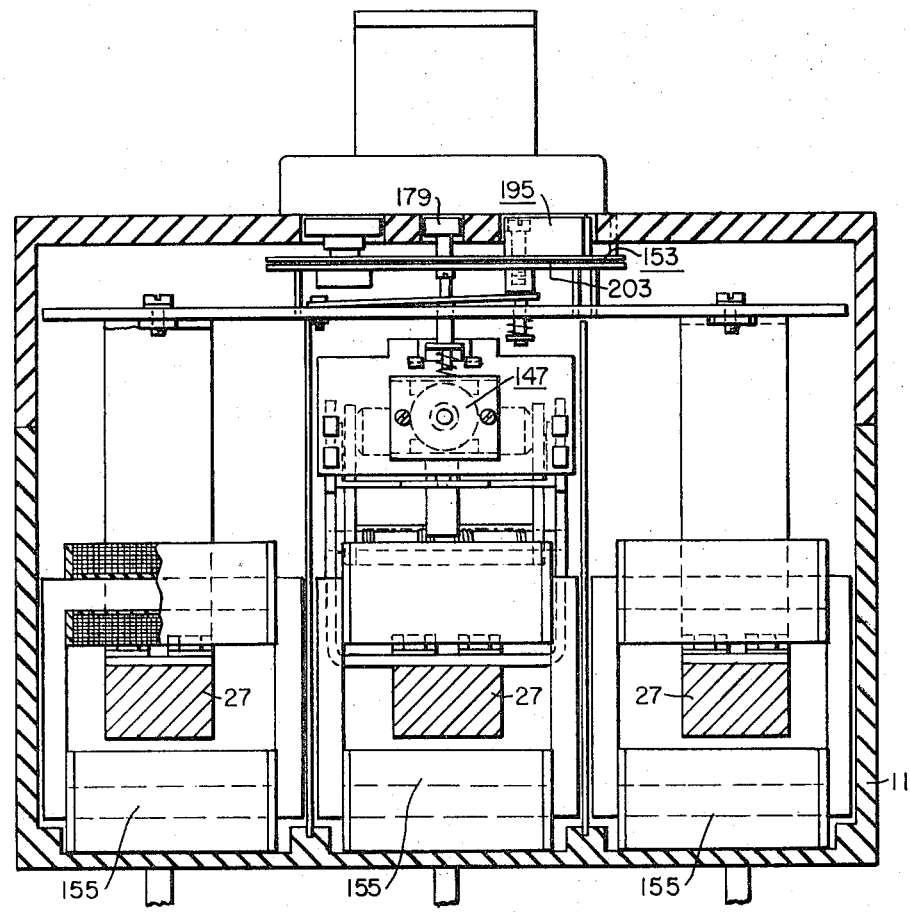
FIG. 4 is a sectional view, with parts broken away, taken generally along the line IV—IV of FIG. 2.

The latch structure 67 and releasable member 61 are shown in the tripped-open position in FIG. 3. In the position of FIG. 3 the latch structure 67 is tripped by movement of the third latch member 131 to the tripped position, in a manner to be hereinafter described, rather than by operation of the magnetic trip actuator 147 which is still in the reset position in FIG. 3. In order to reset the circuit breaker, the releasable member 61 is moved counterclockwise by movement of the handle 77 to a resetting position past the full "off" position of the handle 77 in the manner that was hereinbefore described. During this movement, the free end of the releasable member 61 engages the bight portion 107 of the first latch member 101 to pivot the first latch member 101 in a clockwise direction about the pivot 103. Near the end of this movement, the two rollers 113 drop into the notches 127 of the second latch member 117 and a torsion spring 158 moves the second latch member 117 in a clockwise direction about the pivot 123 to the latched position in FIG. 1. During this movement, the insulating shroud portion 81 (FIG. 1), of the operating handle structure 75, engages one arm 163 of a member 165. The member 165 is generally T-shaped in side view. The member 165 comprises a pair of arms 167 extending horizontally to the left (FIG. 2 and 4), the arm 163 extending horizontally to the right and a downwardly extending leg 169. The arms 167 are pivotally supported on the plate 139 to support the member 165 for pivotal movement about an axis 141 (FIG. 4) that is generally normal to the plane of the paper as seen in FIG. 4. During resetting movement of the handle structure 75 the shroud 81, pivots the member 165 in a clockwise (FIG. 4) direction, and if the circuit breaker is tripped by operation of the trip actuator 147, the downwardly extending leg 169, engaging the projecting port 151 of the plunger 148 will move the plunger 148 against the bias of the spring 151 back to the reset and relatched position. As the plunger 148 is moved back to the reset position, a spring 160 (FIG. 4) operating on the member 131, biases the member 131 in a clockwise direction about the pivot 141 to the reset position seen in FIG. 1 wherein the extended projecting latch portion 145 (FIG. 3) of the second latch member 117 is again latched in the window opening 135 of the third latch member 131. As can be understood with reference to FIG. 1, when the handle structure 75 is moved to reset and relatch the breaker, the handle structure is moved close to the limit of movement in the opening 79, and upon release of the handle structure 75 following a resetting and relatching operation the springs 73 will return the handle structure 75 a short distance to the position seen in FIG. 1. When the armature plunger 148 reaches the reset position seen in FIG. 1, the magnetic trip actuator will automatically reset and the armature structure 148 will be maintained in the reset position by permanent magnetic means in a manner described in the above-mentioned application of Alfred E. Maier et al., Ser. No. 327,964.

Referring to FIG. 3, it will be understood that the arm 137 of the third latch member 131 has an opening therein. A pin member 175 is provided with a lower portion that extends through the opening in the arm 137 and an upper portion that engages an adjustable screw 177 that is screwed into the lower end of a push-button member 179 that is positioned in an opening 181 in the insulating cover 13. The spring 160 biases the third latch member 131 in a clockwise direction to the latched position (FIG. 1) and biases the member 175 upward to thereby bias the push-button member 179 to the upper unactuated position seen in FIG. 1. When the circuit breaker is in the closed position and it is desired to manually trip the circuit breaker, the pushbutton 179 is pressed downwardly against the bias of the spring 160 to move the third latch member 131 in a counterclockwise direction to the tripped position to release the latched structure 67 and the releasable member 61 to thereby trip the circuit breaker in the same manner as was hereinbefore described. During the manual push-to-trip operation the armature plunger 148 remains in the initial unactuated position seen in FIGS. 1-3. Following a manual push-to-trip operation the circuit breaker is relatched in the same manner as was hereinbefore described by movement of the handle structure 75 to the resetting position.

Figure 8:
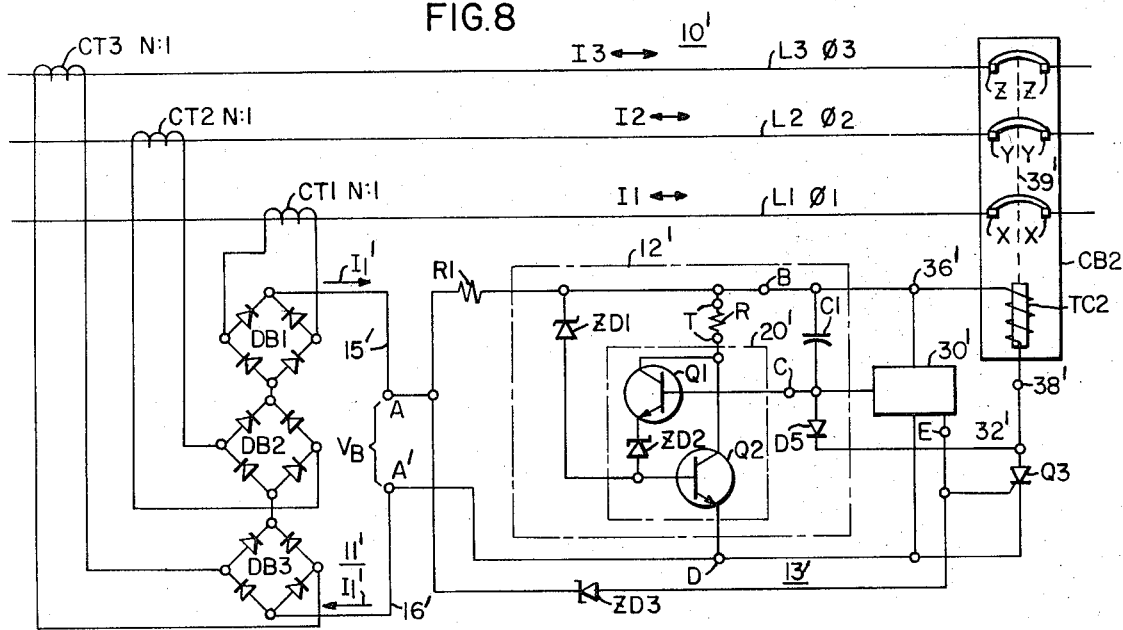
FIG. 8 is a schematic view illustrating the solid state circuit utilized in the circuit breaker of FIGS. 1 and 2.

Referring to FIG. 8, there is disclosed therein a schematic diagram of solid state circuitry more specifically described in the above-mentioned patent application of Alan B. Shimp, Ser. No. 327,973. The reference characters which are the same as the ones used in the above-mentioned application of Alan B. Shimp are primed to distinguish those reference characters from similar reference characters hereinbefore used. The circuit breaker CB2, which represents the circuit breaker 5 herein disclosed, is a three-pole circuit breaker operated by means of a single trip coil TC2 which represents the trip coil used in the magnetic trip actuator 147 disclosed in FIG. 1. The three-pole circuit breaker simultaneously interrupts the three phases L1, L2 and L3. Separate current transformers CT1, CT2, CT3 are magnetically coupled to the separate conducting lines L1, L2, L3 respectively. The current transformers CT1, CT2, CT3 are connected at the output terminals thereof to the input terminals of separate full wave bridge rectifier circuits DB1, DB2, DB3 respectively. The output terminals of the three full wave bridge rectifier circuits DB1, DB2, DB3 are connected in series or auctioneering electrical circuit relationships to produce a current which flows to a solid state or static type control system indicated at 12'. The output of the single circuit 12' is connected to a single timing circuit 30' which provides energy for actuating the single static switch or control means Q3 to thereby energize the trip coil TC2 which, as was hereinbefore described, is the trip coil of the magnetic trip actuator 147 indicated in FIG. 1. The single trip coil TC2 operates the circuit breaker to simultaneously open the three movable contact structure of the three-pole circuit breaker. The resistor R, which is connected at one end to the line 15 and at the other end to the collectors of the transistor Q2 and to another transistor or amplifying element Q1, is a plug-in resistor having a selected resistance value that determines the current rating of the circuit breaker. The plug-in resistor R is externally accessible and removable in a manner to be hereinafter described. The plug-in resistor R may be replaced by another plug-in resistor having a different resistance value to enable the current rating of the circuit breaker to be changed in the field. As will be hereinafter described, the plug-in rating adjuster may be a plug-in rating adjuster that could include a rheostat in order to enable an additional limited change of the current rating without removal of the plug-in rating adjuster. As is described in the above-mentioned application of Alan B. Shimp, the solid state or static type control system 12' is a single control system for operating the single timing circuit 30' to thereby effect operation of the single trip coil TC2 to trip a three-phase circuit breaker in response to an overload in any of three phases.

Figure 5:
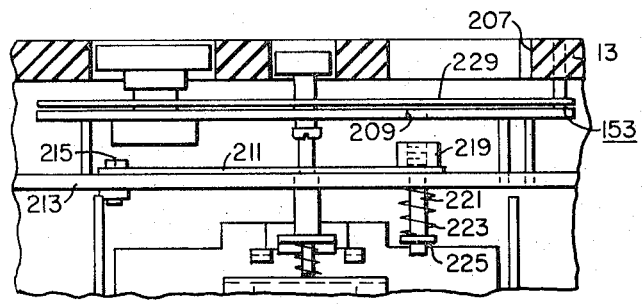
FIG. 5 is a partial view similar to FIG. 4 illustrating the position of certain parts when the rating adjuster is removed.
Figure 6:
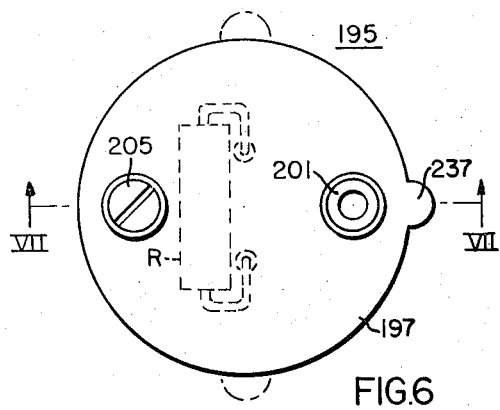
FIG. 6 is a plan view of the plug-in rating adjuster seen in FIGS. 1, 4 and 5.
Figure 7:
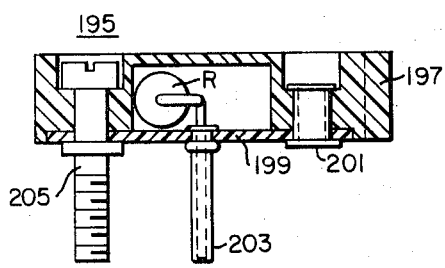
FIG. 7 is a sectional view taken generally along the line VII—VII of FIG. 6.

Referring to FIGS. 2, 4, 6 and 7, a plug-in rating adjuster is indicated generally at 195. The plug-in rating adjuster 195 comprises an insulating housing comprising an insulating cover part 197 and an insulating base part 199 secured together by means of a rivet 201. The resistor R is supported in the cavity in the housing, and a pair of plug-in terminals 203 are connected to the opposite ends of the resistor extending out of the housing as seen in FIG. 7. A mounting screw 205 is supported on the housing for a rotatable movement while captured against axial movement by means of the screw head and a flange portion as seen in FIG. 7. Referring to FIG. 5, it will be noted that the breaker housing cover 13 is provided with an opening 207 therein. The static circuit board 153 is provided with an opening 209 therein. An elongated resilient leaf spring 211 is fixedly secured to a support 213 at one end thereof by means of a screw 215. The elongated leaf spring, at the free end thereof, is provided with an opening therein. A mounting member 219 comprises an inner pin portion 221 that extends through the opening in the free end of the leaf spring 211 and through an opening in the support plate 213. The upper portion of the mounting member 219 comprises a shoulder that engages the leaf spring 211, and a coil spring 223 is captured between the undersurface of the support 213 and a flange 225 on the pin 221 to bias the mounting member 219 downward (FIG. 5) to the position shown in FIG. 5.

As was hereinbefore set forth, the resistor R in the plug-in rating adjuster 195 is the resistor R disclosed in FIG. 8 for determining the rating of the circuit breaker in a manner described in the above-mentioned patent application of Alan B. Shimp, Ser. No. 327,973. The plug-in rating adjuster 195, with the resistor R having the selected resistance value, is mounted on the circuit breaker by being moved through the opening 207 (FIG.

5) in a housing cover 13 with the terminals 203 being plugged into plug-in terminal 229 (FIG. 5) in the circuit board 153. The screw 205 (FIG. 7) engages an internal tapped opening or threaded portion in the mounting member 219 (FIG. 5) when the plug-in rating adjuster 195 is moved into the plugin position. Until the screw 205, however, is rotated to the fully connected position, in a manner to be hereinafter described, the circuit breaker cannot be operated. Referring to FIG. 5, it will be noted that the spring 223 biases the mounting member 219 downward to a tripping position. In this position, the free end of the leaf spring 211 is in a tripping position. As can be understood with reference to FIGS. 3 and 5, the leaf spring 211 is provided with an opening 231 therein and the pin member 175 is provided with a shoulder portion 233 that is engaged by the underside of the leaf spring 211 so that when the leaf spring 211 is in the tripping position seen in FIGS. 3 and 5, the pin member 175 is biased downward to the tripping position maintaining the third latch member 131 in the tripping position shown in FIG. 3 to prevent a resetting operation of the circuit breaker. Thus, the circuit breaker mechanism cannot be reset and manually operated to the closed position until the pin member 175 is drawn upward to permit clockwise movement of the third latch member 131 to the reset position shown in FIG. 1. The leaf sprig 211 is moved out of the tripping position by mounting rotation (clockwise FIG. 2) of the screw 205 (FIG. 7). During the rotation of the screw 205, the screw 205 cooperating with the tapped opening of the mounting member 219 (FIG. 5), draws the mounting member 219 upward from the tripping position seen in FIG. 5 to the non-tripping or inoperative position seen in FIG. 4. This movement permits the resilient leaf spring 211 to move upward to the position seen in FIG. 4 so that the leaf spring 211 (FIG. 3) will no longer prevent resetting and relatching of the circuit breaker mechanism. With the screw 205 rotated to fully secure the plug-in rating adjuster 195 in the position seen in FIG. 4, the circuit breaker can thereafter be reset and relatched and then manually operated in the same manner as was hereinbefore described. When it is desired to remove the plug-in rating adjuster 195 and replace the plug-in rating adjuster 195 with another plugin rating adjuster having a resistance with a different resistance value, the screw 205 is rotated in a counterclockwise (FIG. 2) direction to move the mounting member 219 from the mounted position seen in FIG. 4 to the tripping position seen in FIG. 5, and to release the plug-in rating adjuster 195. This movement will move the spring 211 down to the tripping position seen in FIG. 5 to trip the circuit breaker open if the contacts are closed when the rating adjuster is removed and to maintain the circuit breaker in the tripped condition preventing a relatching operation until another rating adjuster 195 is moved to the mounted and secured position seen in FIG. 4.

Referring to FIGS. 2 and 6, it will be noted that the housing of the plug-in rating adjuster 195 is provided with a key portion 237 that cooperates with a key mating portion or notch 239 in the insulating cover 13 of the circuit breaker. In the manufacture of the circuit breaker 5, the key 237, 239 is constructed such that a plug-in rating adjuster 195 with a resistor having a resistance value that would rate the breaker at higher than the allowable rating of the circuit breaker will not key with the opening 239, and an operator will not be able to mount an improper rating adjuster into the circuit breaker.

As is described in the above-mentioned patent application of Alan B. Shimp, Ser. No. 327,973, removal of the plug-in rating adjuster 195 provides an electrical interlock in that the circuit is so designed that removal of the plug-in rating adjuster will cause the circuit breaker to trip at currents below the current rating of the circuit breaker.

Figure 9:
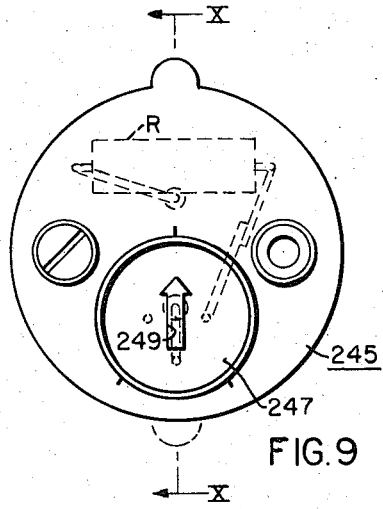
FIG. 9 is a plan view of a replaceable rating adjuster including a rheostat.
Figure 10:
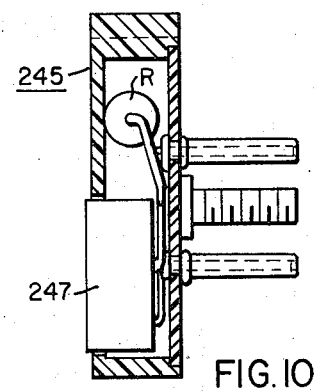
FIG. 10 is a sectional view taken generally along the line X—X of FIG. 9.

Referring to FIGS. 9 and 10, there is disclosed another embodiment of the invention in that a plug-in rating adjuster 245 is provided which is similar to the plug-in rating adjuster 195 except that a rheostat 247 is connected in series with resistor R to provide an additional limited manual rating adjustment of the circuit breaker. The rheostat 247 is provided with a slot 249 therein for receiving a screwdriver to enable the additional limited rating adjustment.

What is claimed is:

1. A circuit breaker comprising a housing, a circuit breaker structure supported in said housing, said circuit breaker structure comprising a pair of contacts operable to open and close an electric circuit, a releasable mechanism, manually operable means manually operable only when said releasable mechanism is in a latched position to open and close said contacts, trip means operating automatically in response to overload current conditions above a predetermined value to release said releasable mechanism whereupon said releasable mechanism automatically moves from said latched position to a tripped position to open said contacts, said manually operable means being operable to move said releasable mechanism from said tripped position to said latched position following release of said releasable mechanism, said trip means comprising an externally accessible replaceable rating adjuster removably supported on said housing, interlock means automatically maintaining said releasable mechanism in said tripped position when said replaceable rating adjuster is removed from said housing, said interlock means comprising a mounting member movably supported in said housing, biasing means biasing said mounting member toward a tripping position wherein said mounting member automatically maintains said releasable mechanism in said tripped position, said mounting member having a tapped opening therein, said replaceable rating adjuster comprising a screw member cooperable with said tapped opening and operable to a securing position to secure said replaceable rating adjuster on said housing during which movement said mounting member is moved to an inoperative position to defeat said interlock means, and upon operation of said screw member to a non-securing position to permit removal of said replaceable rating adjuster from said housing said biasing means automatically moving said mounting member from said inoperative position to said tripping position.

2. A circuit breaker according to claim 1, and said housing and said replaceable rating adjuster comprising keying means cooperable to prevent the mounting of an improper replaceable rating adjuster on said housing.

3. A circuit breaker comprising a housing, a circuit breaker structure supported in said housing, said circuit breaker structure comprising a pair of contacts operable to open and close an electric circuit, a releasable mechanism, manually operable means manually operable only when said releasable mechanism is in a latched position to open and close said contacts, trip means operating automatically in response to overload current conditions above a predetermined value to release said releasable mechanism whereupon said releasable mechanism automatically moves from said latched position to a tripped position to open said contacts, said manually operable means being operable to move said releasable mechanism from said tripped position to said latched position following release of said releasable mechanism, said trip means comprising an externally accessible replaceable rating adjuster removably supported on said housing, interlock means automatically maintaining said releasable mechanism in said tripped position when said replaceable rating adjuster is removed from said housing, electro-mechanical transducing means, sensing means for sensing said overload current conditions about said predetermined value, solid-state circuitry responsive to said sensing means and operating through said electromechanical transducing means to effect release of said releasable mechanism, said replaceable rating adjuster comprising resistor means having a first resistance value and terminal means removably connected to said solid-state circuitry to connect said resistor means in said solidstate circuitry, and said replaceable rating adjuster being removable to permit replacement thereof with another replaceable rating adjuster having a resistance means with a resistance value different from said first resistance value.

4. A circuit breaker according to claim 3, said solid-state circuitry comprising a pair of plug-in type stationary contacts, and said replaceable rating adjuster comprising a pair of plug-in type contacts cooperable with said plug-in type stationary contacts to provide a plug-in type connection between said replaceable rating adjuster and said solid state circuitry.

5. A circuit breaker according to claim 4, and said housing and said replaceable rating adjuster comprising keying means cooperable to prevent the connection of an improper replaceable rating adjuster in said solid-state circuitry.

6. A circuit breaker according to claim 3, said interlocking means comprising a mounting member movably supported in said housing, biasing means biasing said mounting member toward a tripping position wherein said mounting member automatically maintains said releasable mechanism in said tripped position, said mounting member having a tapped opening therein, said replaceable rating adjuster comprising a screw member cooperable with said tapped opening and operable to a securing position to secure said replaceable rating adjuster on said housing during which movement said mounting member is moved to an inoperative position to defeat said interlock means whereupon said manually operable means can be operated to move said releasable mechanism from said tripped position to said latched position following release of said releasable mechanism, and upon operation of said screw member from said securing position to a non-securing position to permit removal of said replaceable rating adjuster said biasing means maintaining said mounting member in said tripping position wherein said mounting member automatically maintains said releasable mechanism in said tripped position.

7. A circuit breaker according to claim 4, said interlock means comprising a mounting member movably supported in said housings, biasing means biasing said mounting member toward a tripping position wherein said mounting member automatically maintains said releasable mechanism in said tripped position, said mounting member having a tapped opening therein, said replaceable rating adjuster comprising a screw member cooperable with said tapped opening and operable to a securing position to secure said replaceable rating adjuster on said housing during which movement said mounting member is moved to an inoperative position to defeat said interlock means whereupon said manually operable means can be operated to move said releasable mechanism from said tripped position to said latched position, and upon operation of said screw member from said securing position to a non-securing position said biasing means automatically maintaining said mounting member in said tripping position wherein said mounting member automatically maintains said releasable mechanism in said tripped position.

8. Circuit breaker according to claim 7, and said replaceable rating adjuster and said housing comprising keying means cooperable to prevent the mounting of an improper replaceable rating adjuster on said housing.

* * * * *